(12) United States Patent
Arthur et al.

(10) Patent No.: US 7,517,600 B2
(45) Date of Patent: Apr. 14, 2009

(54) MULTIPLE PRESSURE REGIME CONTROL TO MINIMIZE RH EXCURSIONS DURING TRANSIENTS

(75) Inventors: David A. Arthur, Honeoye Falls, NY (US); Manish Sinha, Pittsford, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 327 days.

(21) Appl. No.: 11/445,362

(22) Filed: Jun. 1, 2006

(65) Prior Publication Data

US 2007/0281193 A1 Dec. 6, 2007

(51) Int. Cl.
*H01M 8/04* (2006.01)
(52) U.S. Cl. .................. 429/23; 429/26; 429/25
(58) Field of Classification Search .............. 429/26, 429/25, 23, 13
See application file for complete search history.

(56) References Cited

U.S. PATENT DOCUMENTS

| | | | |
|---|---|---|---|
| 2005/0095474 A1* | 5/2005 | Rainville | 429/22 |
| 2006/0263654 A1* | 11/2006 | Goebel et al. | 429/13 |
| 2007/0287041 A1* | 12/2007 | Alp et al. | 429/22 |

* cited by examiner

*Primary Examiner*—Patrick Ryan
*Assistant Examiner*—Thomas H. Parsons

(57) ABSTRACT

A control system for a fuel cell stack that controls the relative humidity of the cathode outlet gas during stack power transients to provide better cathode outlet gas relative humidity control by reducing the dynamic pressure range and thus the dynamic cathode outlet gas relative humidity range. In one embodiment, the control system uses a first narrower cathode pressure range based on stack current density during stack power transients to provide better cathode outlet gas relative humidity control, and uses a second wider cathode pressure range based on stack current density during low current density and steady-state current density to improve system efficiency by decreasing compressor parasitics.

25 Claims, 3 Drawing Sheets ic fuel cells (PEMFC) are a
MULTIPLE PRESSURE REGIME CONTROL TO MINIMIZE RH EXCURSIONS DURING TRANSIENTS

BACKGROUND OF THE INVENTION

1. Field of the Invention

This invention relates generally to a system and method for controlling the relative humidity of the cathode exhaust gas from a fuel cell stack and, more particularly, to a system and method for controlling the relative humidity of the cathode exhaust gas from a fuel cell stack that includes changing the operating range of the cathode pressure based on stack current density during stack power transients.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Excessive stack temperatures may damage the membranes and other materials in the stack. Fuel cell systems therefore employ a thermal sub-system to control the temperature of the fuel cell stack. Particularly, a cooling fluid is pumped through the cooling fluid flow channels in the bipolar plates in the stack to draw away stack waste heat. During normal fuel cell stack operation, the speed of the pump is controlled based on the stack load, the ambient temperature and other factors, so that the operating temperature of the stack is maintained at an optimal temperature, for example 80° C. A radiator is typically provided in a coolant loop outside of the stack that cools the cooling fluid heated by the stack where the cooled cooling fluid is cycled back through the stack.

As is well understood in the art, fuel cell membranes operate with a certain relative humidity (RH) so that the ionic resistance across the membrane is low enough to effectively conduct protons. The relative humidity of the cathode outlet gas from the fuel cell stack is controlled to control the relative humidity of the membranes by controlling several stack operating parameters, such as stack pressure, temperature, cathode stoichiometry and the relative humidity of the cathode air into the stack. For stack durability purposes, it is desirable to minimize the number of relative humidity cycles of the membrane because cycling between RH extremes has been shown to severely limit membrane life. Membrane RH cycling causes the membrane to expand and contract as a result of the absorption of water and subsequent drying. This expansion and contraction of the membrane causes pin holes in the membrane, which create hydrogen and oxygen cross-over through the membrane creating hot spots that further increase the size of the hole in the membrane, thus reducing its life. Further, the fuel cells would be less prone to flooding if the cathode outlet RH is less than 100%. Also, by reducing liquid water in the stack, the stack can be more easily purged at shut-down to reduce the chance of freezing.

During operation of the fuel cell, moisture from the MEAs and external humidification may enter the anode and cathode flow channels. At low cell power demands, typically below 0.2 A/cm², the water may accumulate within the flow channels because the flow rate of the reactant gas is too low to force the water out of the channels. As the water accumulates, droplets form in the flow channels. As the size of the droplets increases, the flow channel is closed off, and the reactant gas is diverted to other flow channels because the channels are in parallel between common inlet and outlet manifolds. As the droplet size increases, surface tension of the droplet may become stronger than the delta pressure trying to push the droplets to the exhaust manifold so the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

As mentioned above, water is generated as a by-product of the stack operation. Therefore, the cathode exhaust gas from the stack will include water vapor and liquid water. It is known in the art to use a water vapor transfer (WVT) unit to capture some of the water in the cathode exhaust gas, and use the water to humidify the cathode input airflow.

The relative humidity (RH) of the cathode outlet gas is a function of the cathode stoichiometry, the pressure of the cathode outlet gas and the temperature of the cooling fluid exiting the stack. From an RH control perspective it is desirable to maintain the cathode stoichiometry, the cathode outlet gas pressure and the cathode outlet gas temperature substantially constant to maintain the desired relative humidity. However, there are certain limitations and realities that the fuel cell system must meet in order to provide efficient and effective performance.

A fuel cell system controller will typically use a cathode outlet gas pressure table that identifies a certain cathode outlet pressure depending on the current density being generated by the stack. Because stack voltage increases with pressure, a higher cathode pressure is generally provided as the stack current density increases. Further, high cathode pressures at idle would cause significant compressor parasitics. For a low stack current density, the lower end of the cathode pressure range may be about 102 kPa and for a high stack current density, the cathode pressure may be about 143 kPa. The cathode stoichiometry at low current density may be around 5 to force water out of the cathode flow channels to provide voltage stability. The cathode stoichiometry at high current density may be around 1.8 because of the limitations on the compressor speed.

SUMMARY OF THE INVENTION

In accordance with the teachings of the present invention, a control system for a fuel cell stack is disclosed that controls the relative humidity of the cathode outlet gas during stack power transients to provide cathode outlet gas relative humidity control by reducing the dynamic pressure range, and thus the dynamic cathode outlet gas relative humidity range. In one embodiment, the control system uses a first narrower cathode pressure range based on stack current density during stack power transients or dynamic cycles to provide better cathode outlet gas relative humidity control, and uses a second wider cathode pressure range based on stack current density during low current density and steady state current density to improve system efficiency by decreasing compressor parasitics.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a control system for a fuel cell stack that controls the cathode outlet gas relative humidity by changing the cathode pressure operating range during power transients is merely exemplary in nature, and is in no way intended to limit the invention or its applications or uses.

Figure 1:
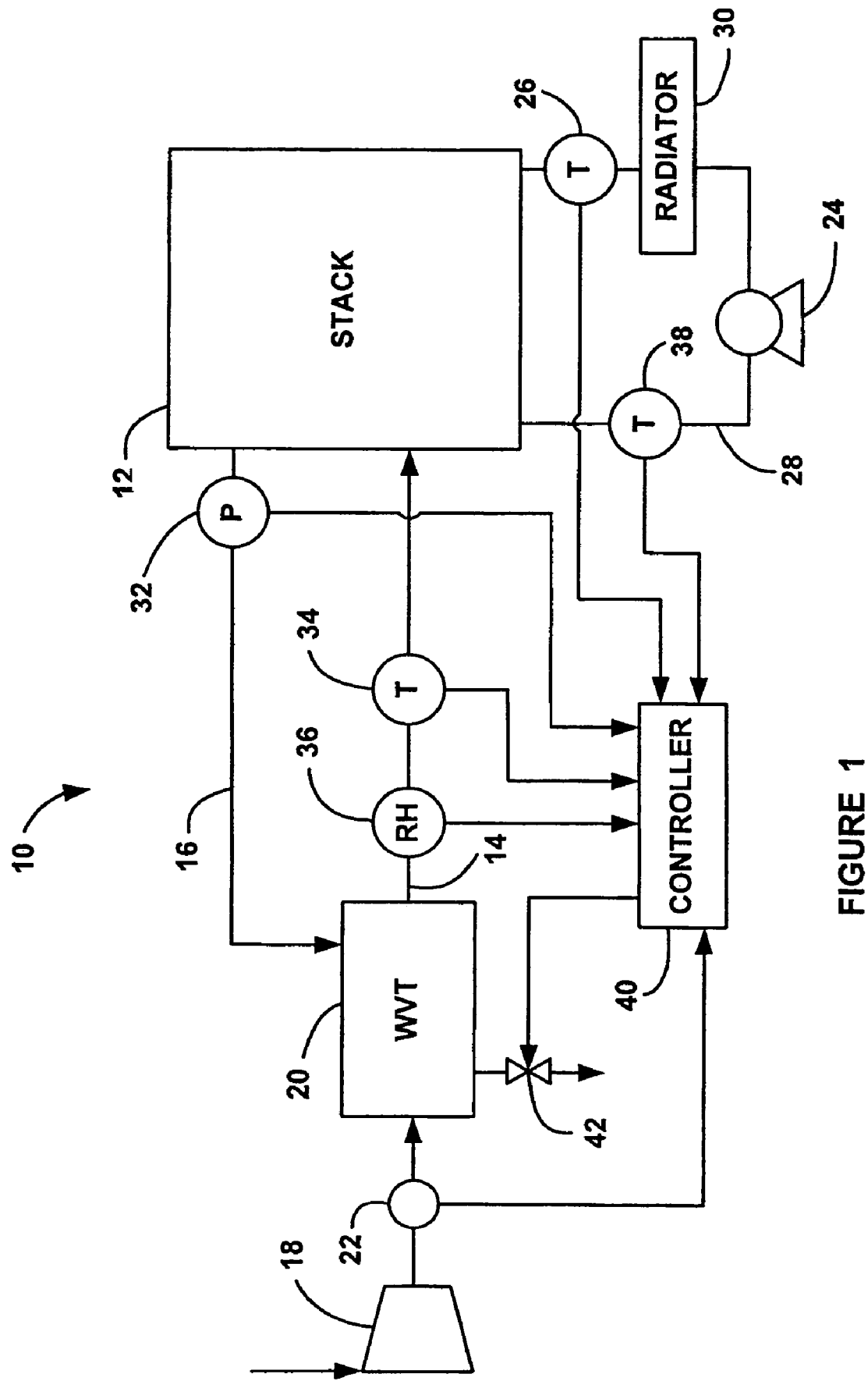
FIG. 1 is a schematic block diagram of a fuel cell system including a controller for controlling cathode outlet gas relative humidity, according to an embodiment of the present invention.

FIG. 1 is a schematic block diagram of a fuel cell system 10 including a fuel cell stack 12. The stack 12 includes a cathode input line 14 and a cathode output line 16. A compressor 18 generates a flow of air for the cathode side of the stack 12 that is sent through a WVT device 20 to be humidified. A mass flow meter 22 measures the flow rate of the air from the compressor. The humidified air is input into the stack 12 on the line 14, and humidified cathode exhaust gas is provided on the output line 16. The cathode exhaust gas on the line 16 is sent through the WVT device 20 to provide the water vapor for humidifying the cathode input air. The WVT device 20 can be any suitable WVT device for the purposes described herein.

The system 10 includes a pump 24 that pumps a cooling fluid through a coolant loop 28 that flows through a stack 12. The heated cooling fluid from the stack 12 is sent through a radiator 30 where it is cooled to be returned to the stack 12 through the coolant loop 28. The system 10 also includes a backpressure valve 42 positioned in the cathode exhaust gas line 14 after the WVT device 20 for controlling the pressure of the cathode side of the stack 12.

The system 10 includes several sensors for sensing certain operating parameters. Particularly, the system 10 includes an RH sensor 36 for measuring the relative humidity of the cathode inlet air in the line 14, and a temperature sensor 34 for measuring the temperature of the cathode inlet air in the line 14. It is known in the art to use a dew point sensor instead of the combination of the RH sensor 36 and the temperature sensor 34. A temperature sensor 38 measures the temperature of the cooling fluid in the coolant loop 28 entering the stack 12, and a temperature sensor 26 measures the temperature of the cooling fluid exiting the stack 12. A pressure sensor 32 measures the pressure of the cathode exhaust gas in the line 16. As is known in the art, the measured relative humidity of the cathode inlet air needs to be corrected because the temperature of the stack 12 is different than the temperature of the air in the inlet line 14. By knowing the inlet RH and the temperature of the cooling fluid entering the stack 12, the corrected relative humidity of the cathode air can be calculated.

A controller 40 receives the mass flow signal from the mass flow meter 22, the relative humidity signal from the RH sensor 36, the temperature signal from the temperature sensor 34, the temperature signal from the temperature sensor 38, the temperature signal from the temperature sensor 26 and the pressure signal from the pressure sensor 32. The controller 40 also controls the backpressure valve 42.

Equations are known in the art for calculating the cathode outlet relative humidity, the cathode stoichiometry and the cathode inlet RH, the cathode output relative humidity can be calculated by:

$$\frac{100 \cdot P_1}{\left[10^{7.903 \frac{1674.5}{229.15+T_1}}\right][CS+0.21]\left(1-\frac{10^{7.903\frac{1674.5}{229.15+T_1}}}{P_1+P_2}\right)} \quad (1)$$

$$[2 \cdot 0.21] + \left[\left(\frac{10^{7.903\frac{1674.5}{229.15+T_1}}}{P_1+P_2}\right)(CS - 2 \cdot 0.21)\right]$$

The cathode stoichiometry can be calculated by:

$$\frac{\text{Air\_mass\_flow [g/s]}}{4.33 \cdot \left[\frac{\text{Cell\_Count} \cdot \text{Stack\_Current[amps]}}{(1.6022 \cdot 10^{-19})(6.022 \cdot 10^{23})}\right]\left[\frac{1}{4}\right] \cdot 2 \cdot 15.9994} \quad (2)$$

The cathode inlet relative humidity percentage can be calculated by:

$$\frac{10^{7.093 \frac{1674.5}{229.15+T_2[C]}}}{10^{7.093 \frac{1674.5}{229.15+T_3[C]}}} \quad (3)$$

Where CS is the cathode stoichiometry, $T_1$ is the stack cooling fluid outlet temperature in degrees Celsius, $P_1$ is the cathode outlet pressure in kPa, $T_2$ is the cathode inlet temperature in degrees Celsius, $P_2$ is the cathode pressure drop in kPa, which is calculated based on a known model, and $T_3$ is the stack cooling fluid inlet temperature in degrees Celsius.

According to the invention, the controller 40 uses one dynamic pressure range based on stack current density, for example 102 kPa-143 kPa, for the pressure of the cathode exhaust gas on the line 18 by controlling the backpressure valve 42 when the fuel cell stack 12 is at low or idle current density, such as 0.1 A/cm², or at a steady state current density for some period of time. When the stack 12 is in a transient current density or dynamic cycle, the dynamic pressure range of the cathode exhaust gas is changed to a different range, for example 120 kPa-143 kPa, so that the relative humidity of the cathode exhaust gas is maintained at or near a desirable relative humidity for humidifying the cathode inlet air on line 14. By switching back and forth between the cathode pressure set-point ranges depending on the current density of the stack 12 as discussed above, significant improvement in the RH control of the cathode outlet gas can be provided during power transients, and low power compressor parasitics can be reduced when the stack 12 is at idle current density or a steady state current density.

Figure 2:
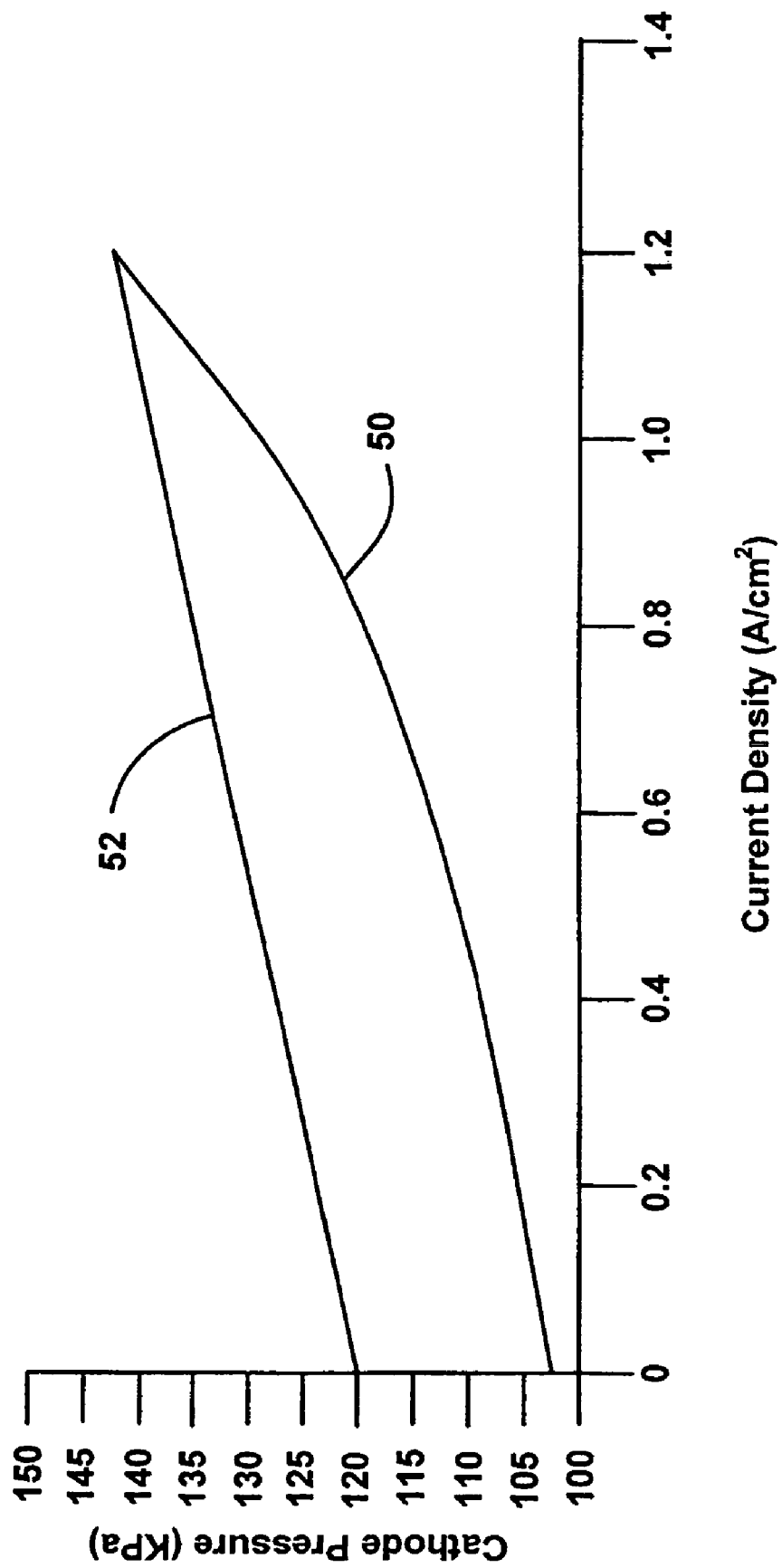
FIG. 2 is a graph with current density on the horizontal axis and cathode pressure on the vertical axis showing two pressure ranges used by the stack depending on whether the stack is at idle or steady state or whether the stack is in a power transient.

FIG. 2 is a graph with current density on the horizontal axis and cathode pressure on the vertical axis showing the two cathode dynamic pressure ranges discussed above. Particularly, graph line 50 is the known pressure control table for system efficiency that provides a cathode pressure range between 102 kPa at very low current density and 143 kPa at the maximum stack current density of 1.2 A/cm². According to the invention, a second (upper) cathode pressure range is provided, represented by graph line 52, that has a range between 120 kPa at very low current density and 143 kPa at the maximum current density. As is apparent, the pressure range for the upper pressure table is substantially linear. By changing the pressure table for the cathode outlet gas pressure to the pressure line 52 during power transients or during dynamic cycles, the relative humidity of the cathode exhaust gas will increase, thus allowing the relative humidity of the cathode inlet air to be at the desired value.

The control algorithm will stay at the higher pressure table for some period after the power transient is over, such as 60 seconds, when the vehicle may go back to a steady state operation or to an idle condition. The lower pressure table for the steady state operation provides a lower stack pressure for the same current density as the upper pressure table, and thus has a reduction in compressor parasitics that reduce system efficiency. Therefore, it is desirable to return to the lower pressure table sometime after the dynamic cycle has stopped.

Figure 3:
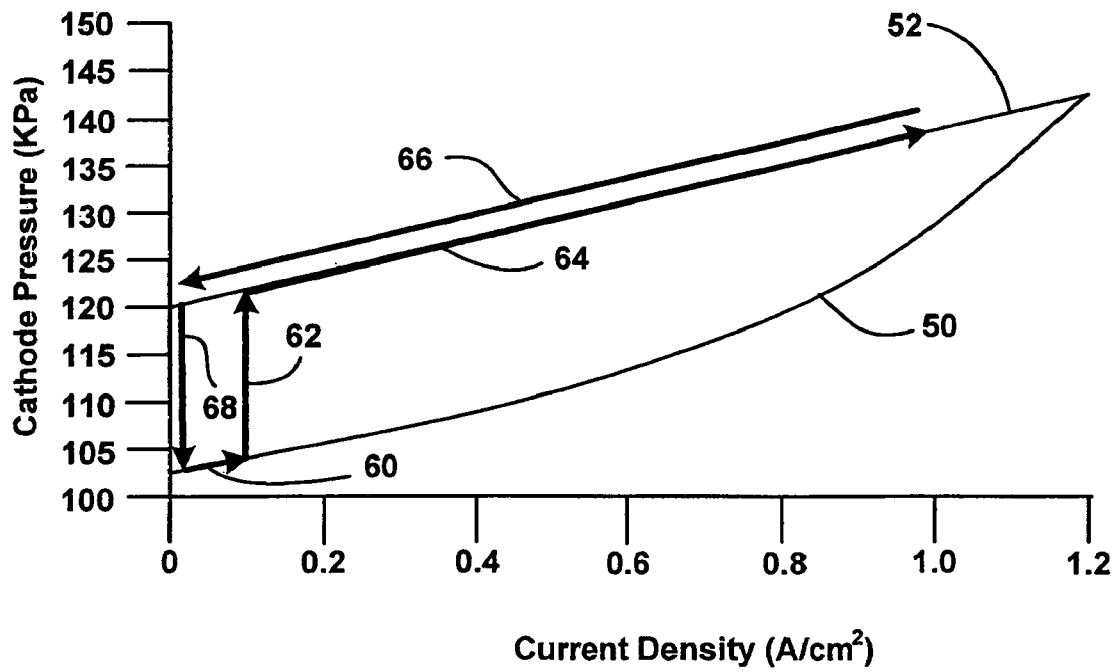
FIG. 3 is a graph with current density on the horizontal axis and cathode pressure on the vertical axis showing a process for switching between the two pressure ranges for one stack operating condition.
Figure 4:
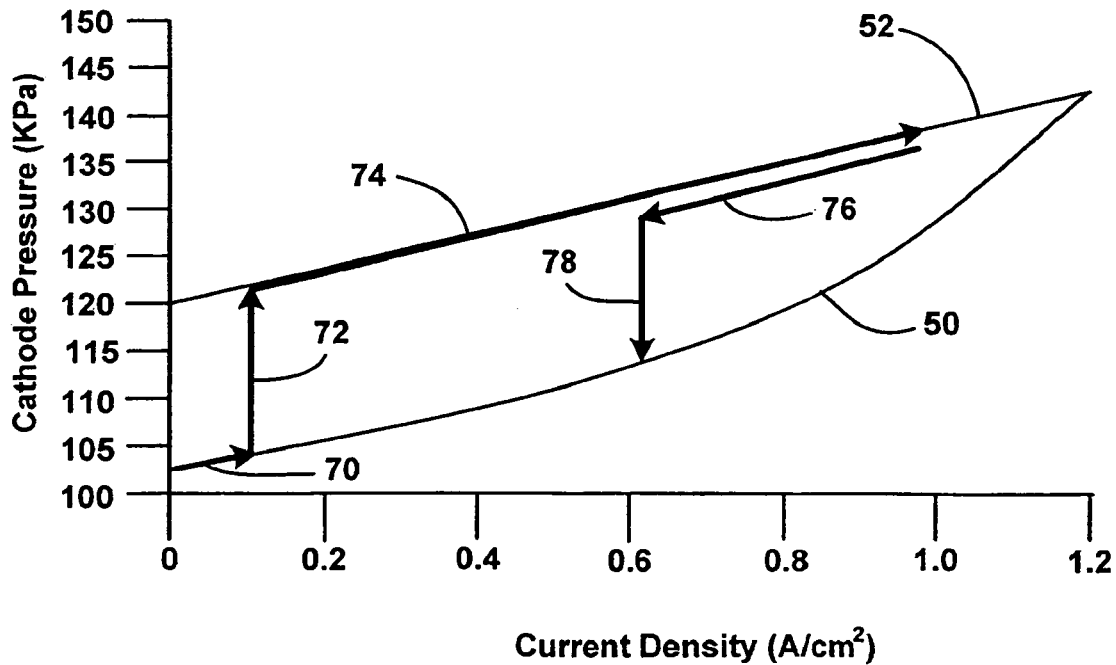
FIG. 4 is a graph with current density on the horizontal axis and cathode pressure on the vertical axis showing a process for switching between the two pressure ranges for another stack operating condition.

FIGS. 3 and 4 are graphs with current density on the horizontal axis and cathode pressure on the vertical axis showing two processes according to the invention for switching between the cathode dynamic pressure ranges identified by graph lines 50 and 52 for two different stack operating conditions. FIG. 3 shows a scenario where the vehicle is at idle for a relatively long period of time, then accelerates up to 1.0 A/cm², and then goes back to an idle condition. From the idle condition, stack current density increases to about 0.1 A/cm² along line 60 on the dynamic pressure range of the graph line 50. When the current density goes above 0.1 kA/cm², the pressure control switches on line 62 to the dynamic pressure range of the graph line 52. As the vehicle speed increases and the stack current density increases along line 64 to 1.0 A/cm², the dynamic pressure range will remain on the graph line 52. The stack then goes back to an idle current density less than 0.1 A/cm² on line 66. If the stack current density is held for some predetermined period of time below 0.1 A/cm², then the controller would return to the pressure table of the graph line 50 on line 68. Alternately, if a second acceleration occurred from the low stack current density before the time period expired, the control will remain on the pressure line 52.

FIG. 4 represents a stack operating condition where the vehicle remains at idle for a long time, then accelerates up to about 1.0 A/cm², and then reduces to a steady state current density at about 0.6 A/cm². If the vehicle begins to accelerate from an idle condition, the pressure control follows line 70 on the graph line 50, then jumps to the pressure table of the graph line 52 on line 72 when the current density goes above 0.1 A/cm². As the vehicle accelerates from idle, the pressure control remains on the graph line 52 represented by line 74. If the stack current density reduces from 1.0 A/cm² to about 0.6 A/cm² on line 76, and remains there for some period of time, for example, 10 seconds, then the pressure control would switch back to the pressure table of the graph line 50 on line 78.

By controlling the relative humidity of the cathode outlet gas in this manner, the fuel cells are less prone to flooding. If the cathode outlet relative humidity is less than 100%, the liquid water in the stack 12 is reduced so as to allow the stack 12 to be more easily purged at shut-down, which reduces freezing concerns. Additionally, good relative humidity control results in less MEA RH cycling above and below 100% relative humidity. These wet/dry transitions of the MEA cause both higher voltage degradation and pin hole formation in the membrane.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
a fuel cell stack receiving a cathode inlet airflow and outputting a cathode exhaust gas flow;
a compressor for providing the cathode inlet airflow to the stack;
a water vapor transfer device receiving the cathode inlet airflow from the compressor and the cathode exhaust gas flow from the fuel cell stack, said water vapor transfer device using water vapor in the cathode exhaust gas to humidify the cathode inlet air; and
a controller for controlling the relative humidity of the cathode exhaust gas flow so as to control the relative humidity of the cathode inlet air, said controller causing a cathode of the fuel cell stack to operate in a first cathode pressure range based on the current density being produced by the stack if the stack current density is below a predetermined value, and causing a cathode of the fuel cell stack to operate in a second cathode pressure range based on the current density being produced by the stack if the stack current density is above the predetermined value, wherein the first and second pressure ranges are different and the second pressure range is narrower than the first pressure range.

2. The system according to claim 1 wherein the controller operates in the first pressure range if the stack current density is below the predetermined value or is in a steady state operation, and operates in the second pressure range if the stack current density is above the predetermined value and is in a power transient.

3. The system according to claim 2 wherein the power transient is an up power transient.

4. The system according to claim 3 wherein the controller maintains the cathode pressure in the first pressure range for some period of time after the up power transient when the current density is below the predetermined value or at steady state.

5. The system according to claim 4 wherein the period of time is about 60 seconds.

6. The system according to claim 1 wherein the first pressure range provides a higher pressure than the second pressure range over the entire stack current density range.

7. The system according to claim 1 further comprising a backpressure valve positioned within a cathode exhaust line, said controller opening and closing the backpressure valve to change the cathode pressure.

8. The system according to claim 1 wherein the first pressure range provides greater system efficiency and the second pressure range provides better cathode exhaust gas relative humidity control.

9. The system according to claim 1 wherein the first pressure range is about 102 kPa-143 kPa and the second pressure range is about 120 kPa-143 kPa.

10. The system according to claim 1 wherein the predetermined value is about 0.1 A/cm$^2$.

11. A fuel cell system comprising:
a fuel cell stack receiving a cathode inlet airflow and outputting a cathode exhaust gas flow; and
a controller for controlling the relative humidity of the cathode exhaust gas flow so as to control the relative humidity of the cathode inlet airflow, said controller causing a cathode of the fuel cell stack to operate in a first cathode pressure range if the stack current density is below a predetermined current density or is in a steady state operation, and causing a cathode of the fuel cell stack to operate in a second cathode pressure range if the stack current density is above the predetermined value and is in a dynamic cycle, wherein the first and second pressure ranges are different.

12. The system according to claim 11 wherein the first pressure range is about 102 kPa-143 kPa and the second pressure range is about 120 kPa-143 kPa.

13. The system according to claim 11 wherein the predetermined value is about 0.1 A/cm$^2$.

14. The system according to claim 11 wherein the controller maintains the cathode pressure in the first pressure range for some period of time after the dynamic cycle when the current density is below the predetermined value or at steady state.

15. The system according to claim 14 wherein the period of time is about 60 seconds.

16. The system according to claim 11 wherein the first pressure range provides a higher pressure than the second pressure range over the entire stack current density range.

17. The system according to claim 11 wherein the second pressure range is narrower than the first pressure range.

18. The system according to claim 11 wherein the first pressure range provides greater system efficiency and the second pressure range provides better cathode exhaust gas relative humidity control.

19. A method for controlling the cathode pressure of a fuel cell stack, said method comprising:
using a first cathode pressure range if the stack current density is below a predetermined current density or is in a steady state current density; and
using a second cathode pressure range if the stack current density is above the predetermined value and is in a dynamic cycle.

20. The method according to claim 19 wherein the second pressure range is narrower than the first pressure range.

21. The method according to claim 19 wherein the first pressure range is about 102 kPa-143 kPa and the second pressure range is about 120 kPa-143 kPa.

22. The method according to claim 19 wherein the predetermined value is about 0.1 A/cm$^2$.

23. The method according to claim 19 further comprising maintaining the cathode pressure in the first pressure range for some period of time after the dynamic cycle when the current density is below the predetermined value or at steady state.

24. The method according to claim 19 wherein the first pressure range provides a higher pressure than the second pressure range over the entire stack current density range.

25. The method according to claim 19 wherein the first pressure range provides greater system efficiency and the second pressure range provides better cathode exhaust gas relative humidity control.

* * * * *